United States Patent [19]

Haraikawa

[11] 3,935,927
[45] Feb. 3, 1976

[54] DISC BRAKE FOR USE IN TWO-WHEELED VEHICLE

[75] Inventor: Tetsuo Haraikawa, Funabashi, Japan

[73] Assignee: Tokico Ltd., Kawasaki, Japan

[22] Filed: July 22, 1974

[21] Appl. No.: 490,707

[30] Foreign Application Priority Data
Aug. 7, 1973 Japan............... 48-88645

[52] U.S. Cl................ 188/73.3; 188/26
[51] Int. Cl.² .................. F16D 55/224
[58] Field of Search............ 188/26, 72.4, 73.3

[56] References Cited
UNITED STATES PATENTS

| | | | |
|---|---|---|---|
| 2,612,968 | 10/1952 | Hood | 188/26 |
| 3,416,634 | 12/1968 | Swift | 188/73.3 |
| 3,655,015 | 4/1972 | Mennesson | 188/26 |
| 3,655,016 | 4/1972 | Watanabe | 188/26 |
| 3,675,741 | 7/1972 | Frei et al. | 188/26 |
| 3,765,511 | 10/1973 | Toyomasu | 188/26 |

FOREIGN PATENTS OR APPLICATIONS 842,075 6/1939 France............ 188/72.4

Primary Examiner—Trygve M. Blix
Assistant Examiner—Edward R. Kazenske
Attorney, Agent, or Firm—Wenderoth, Lind & Ponack

[57] ABSTRACT

A disc brake for use in a two-wheeled vehicle is disclosed, in which the position of an axle of the two-wheeled vehicle relative to the frame of vehicle is adjusted without changing the relative position in the radial direction of a caliper assembly to a brake disc. The disc brake for a two-wheeled vehicle of the present invention comprises an attaching bracket and a caliper assembly to be mounted on the attaching bracket, the attaching bracket having a hole provided in one end by which the bracket is pivotally mounted on an axle of a wheel coaxially therewith and the other end is provided with a hole, by which the bracket is pivotally mounted on another link member.

1 Claim, 4 Drawing Figures

DISC BRAKE FOR USE IN TWO-WHEELED VEHICLE

BACKGROUND AND BRIEF DESCRIPTION OF THE INVENTION

This invention relates to a disc brake for use in a two-wheeled vehicle, and more particularly to a disc brake suited for a brake device for the rear wheel of a two-wheeled vehicle.

In general, in a two-wheeled vehicle, the axle of the rear wheel is shiftable frontwards or rearwards relative to the frame of vehicle for adjusting tension of the drive chain. Where a disc brake is employed as a brake device for a two-wheeled vehicle, if the caliper of a brake is rigidly mounted on the frame in a fixed position, the relative position in the radial direction, of the caliper to the brake disc will be changed upon respective adjustment of tension of a drive chain, resulting in the failure to effect a normal braking action. To cope with this problem, a device has been proposed, in which a holding member rotatable about an axle of a rear wheel is provided, independently of a brake assembly, so as to hold a caliper thereon. These conventional devices, however, are complex in construction and expensive to manufacture.

It is accordingly an object of the present invention to provide an improved disc brake for use in a two-wheeled vehicle, which is inexpensive to manufacture and in which adjustment of tension of a drive chain can be achieved without changing the relative position in the radial direction of a caliper to a brake disc. According to the present invention, there is provided a disc brake which comprises a caliper having a hole therethrough, and an attaching bracket adapted for mounting the caliper, on the attaching bracket having one portion pivotally mounted on an axle of a wheel and extending through the aforesaid hole of the caliper to the exterior of the caliper, and the other portion adapted to be attached to other member.

The object and features of the present invention will be apparent from a reading of the ensuing part of the specification in conjunction with drawings which show a preferred embodiment of the invention.

Figure 1:
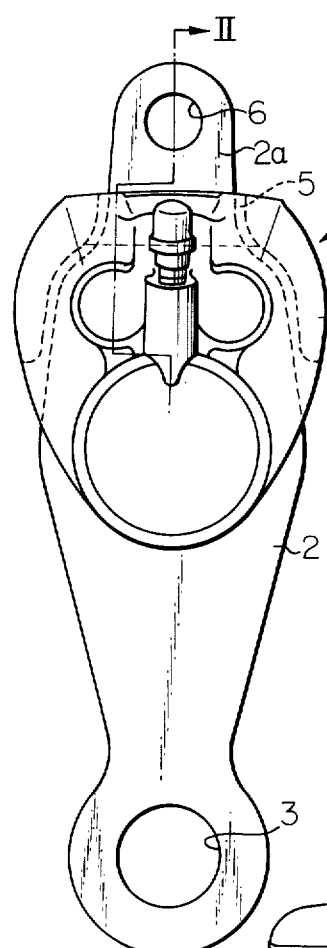
FIG. 1 is a side elevational view showing a preferred embodiment of the present invention.
Figure 2:
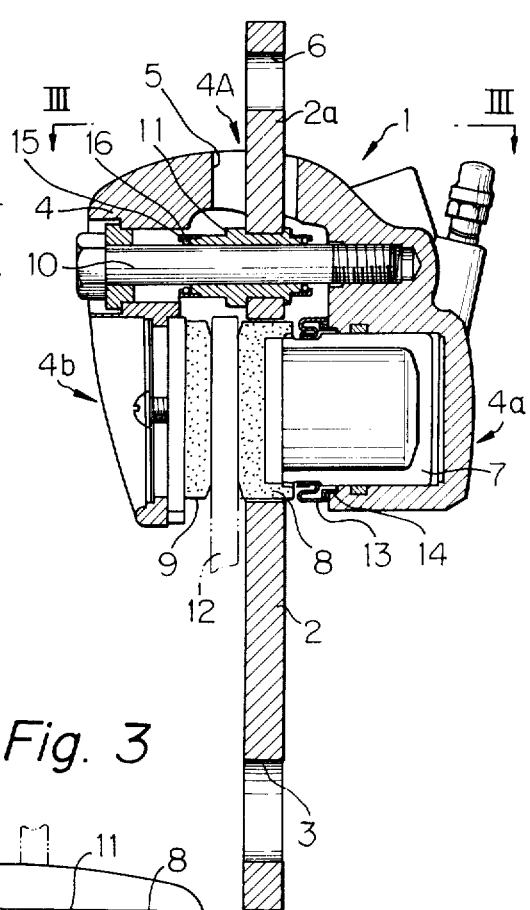
FIG. 2 is a cross-sectional view taken along the line II—II of FIG. 1.
Figure 3:
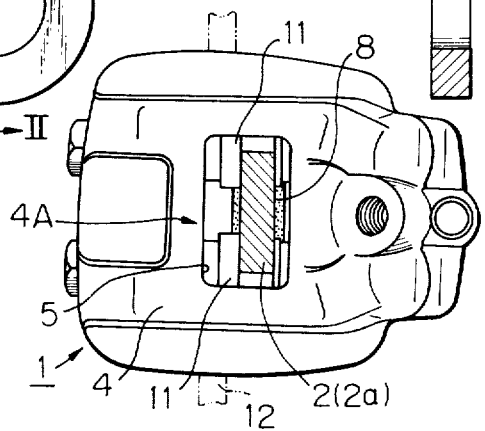
FIG. 3 is a cross-sectional view taken along the line III—III of FIG. 2.

DETAILED DESCRIPTION OF THE INVENTION:

Referring to FIGS. 1 through 3, shown at 1 is a caliper assembly, at 2 an attaching bracket for mounting the caliper assembly 1 and mounting same on an axle of a rear wheel, the bracket 2 having at one end an attaching portion 3 provided with a projection and a hole, in which an axle of a wheel of the two-wheeled vehicle is to be rotatably mounted. The caliper 4 is provided with a hole 5 through its top portion 4A, through which the attaching bracket 2 is inserted so as to extend outside the caliper. The extension 2a of bracket 2 has an attaching portion 6 provided with a hole and a projection. The attaching bracket 2 corresponds to a caliper holder of a general disc brake (for example, the disc brake used for a four-wheeled automobile) and acts to mount the caliper assembly 1 thereon. The way the bracket is mounted the caliper assembly 1 is no different from that in the conventional disc brake. Slidably disposed within a leg portion 4a of the caliper 4 is a piston 7, which is adapted to be pressed against a friction pad 8 slidably fitted in the attaching bracket 2. A friction pad 9 is positively attached to the other leg portion 4b of caliper 4 in opposed facing relation to the friction pad 8. A caliper axle 10 is fixedly inserted transversely in both leg portions 4a and 4b of caliper 4 and is slidably fitted in a collar 11 having a groove, in which the bracket 2 is securely attached. Thus, the caliper 4 is mounted on the attaching bracket 2 in a manner so as to be shiftable in a direction perpendicular to the longitudinal axis of bracket 2. Since a brake disc 12 rotatable together with the wheel is positioned between the friction pads 8 and 9, if the piston 7 is pressed by means of hydraulic pressure against the side of brake disc 12 upon braking action, the friction pad 8 fitted in the attaching bracket 2 will be forced by the piston 7 against one face of brake disc 12. At the same time, a reacting force due to the pressing force of the piston acts on the caliper 4 so that the caliper 4 will shift in a direction opposite to the moving direction of the piston 7 under the guidance of the collar 11, whereby the friction pad 9 will be urged against the other face of brake disc 12, thereby achieving a braking action. In FIG. 2, shown at 13 is a boot for preventing dust from getting into the caliper, at 14 a retainer for boot, at 15 an O-ring, and at 16 a cap.

Figure 4:
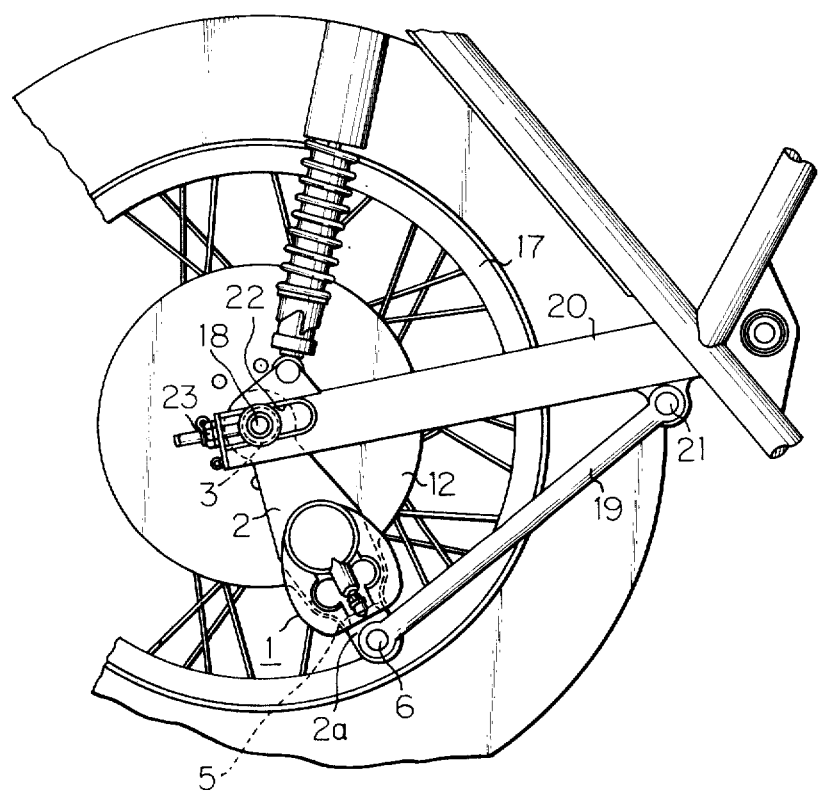
FIG. 4 is a side view of the disc brake according to the present invention, shown incorporated in the rear wheel of a two-wheeled vehicle.

The brake device of the present invention having the construction described is attached to a two-wheeled vehicle in a manner as shown in FIG. 4. The attaching portion 3 of bracket 2 is pivotally mounted on the axle 18 of the wheel 17, with another attaching portion 6 of extending portion 2a of bracket 2 pivotally mounted on a shaft mounted in a drag link whose one end is pivotally mounted on a shaft of a frame 20 of the vehicle. Under the situation described, the brake disc 12 rotatable with the wheel 17 stands in a position between the two friction pads 8 and 9. The axle 18 of wheel 17 is fitted in a slot 22 provided in the frame 20 of vehicle and adapted to slide through the slot. Although the positioning of the axle 18 is effected by means of an adjusting nut 23 at the time of adjusting the tension of a drive chain (not shown), there is no risk that a relative position in the radial direction, of the caliper assembly 1 to the brake disc 12 will be changed due to the adjustment of tension of the drive chain, since the caliper assembly 1 is held in position by the attaching bracket 2 which is rotatable about the axle 18 of wheel 17. When adjustment of the tension of a drive chain is effected, the drag link 19 alone rotates about the shaft, on which the same is mounted, to some extent corresponding to displacement of the axle 18. Thus, a normal braking action is achieved, without causing an abnormal braking action resulting from the tension adjustment of a drive chain. According to the present invention, the hole 5 is provided in the caliper 4, through which the attaching bracket 2 extends outside the caliper, so that dust or moisture which gets into the back portion of top portion 4a of caliper will be discharged through the hole outside the caliper. This assists in providing a normal braking action.

The above description is given for the case where the present invention is applied to the rear wheel of a two-wheeled vehicle, the axle of which is shifted upon adjustment of tension of a drive chain. It of course falls within the scope of invention to apply the disc brake to the front wheel of a two-wheeled vehicle.

As is apparent from the foregoing, there is obtained an improved disc brake for use in a two-wheeled vehicle, which is simple in construction and inexpensive to manufacture. The disc brake of the present invention is particularly useful as a brake device for the rear wheel of a two-wheeled vehicle having an axle displaceable upon adjustment of tension of a drive chain, since displacement in the radial direction, of a caliper with respect to a brake disc is avoided.

It is apparent that various modifications and changes may be made without departing from the spirit or scope of the invention and appended claims.

What is claimed is:

1. A disc brake particularly adapted for use in a two-wheeled vehicle, comprising:
   a pair of friction pads;
   a C-shaped caliper body having a hole therethrough in a top portion thereof, and having a cylinder in one leg portion thereof into which hydraulic pressure can be supplied, the other leg portion thereof having one of said friction pads thereon opposite said cylinder;
   a piston having one end slidably inserted into said cylinder and to the other end of which is fixed the other friction pad;
   a caliper axle fixed to said caliper and extending parallel with the axis of said cylinder;
   a collar slidably mounted on said caliper axle; and
   a supporting bracket comprising a flat plate extending through the central space of said caliper body with one end of said bracket extending through the hole in the top portion of said C-shaped caliper body and having a hole in said one end for pivotally mounting said bracket on the axis of a wheel coaxially therewith and having a hole in the other end for pivotally mounting said bracket to one end of a link member, a further hole between said two first-mentioned holes in which said collar is fixed, and a still further hole in which is slidably mounted the other friction pad;
   whereby said bracket can be positioned with the one end pivoted on the axle of the wheel of the motor vehicle coaxially with a brake disc and with the other end pivotally connected to the link which is in turn pivoted to the vehicle frame, so that when the wheel is adjusted relative to the frame the relative position of the friction pads and the brake disc remain unchanged.

* * * * *